(12) United States Patent
Nakao (10) Patent No.: US 6,798,803 B2
(45) Date of Patent: Sep. 28, 2004

(54) GAS LASER DEVICE

(75) Inventor: Kiyoharu Nakao, Isehara (JP)

(73) Assignee: Komatsu Ltd., Tokyo (JP)

( * ) Notice: Subject to any disclaimer, the term of this patent is extended or adjusted under 35 U.S.C. 154(b) by 140 days.

(21) Appl. No.: 10/300,904

(22) Filed: Nov. 21, 2002

(65) Prior Publication Data

US 2003/0099270 A1 May 29, 2003

(30) Foreign Application Priority Data

Nov. 29, 2001 (JP) ........................................ 2001-364625

(51) Int. Cl.[7] .............................. H01S 3/00; H01S 3/22
(52) U.S. Cl. ................ 372/38.02; 372/38.1; 372/38.01; 372/38.03; 372/38.04; 372/38.07; 372/55
(58) Field of Search ............................ 372/38.1, 38.02, 372/38.03, 38.07, 55, 38.01, 38.04

(56) References Cited

U.S. PATENT DOCUMENTS

| | | | |
|---|---|---|---|
| 4,637,030 A | * 1/1987 | Midavaine et al. ............ 372/82 |
| 6,005,880 A | * 12/1999 | Basting et al. ............ 372/38.04 |
| 6,016,325 A | 1/2000 | Ness et al. ............... 372/38.07 |
| 6,240,112 B1 | * 5/2001 | Partlo et al. .................... 372/34 |
| 6,327,286 B1 | 12/2001 | Ness et al. ................ 372/38.02 |
| 6,400,741 B1 | 6/2002 | Matsunaga et al. ....... 372/38.02 |
| 6,421,362 B1 | * 7/2002 | Matsunaga ................ 372/38.02 |
| 6,535,540 B1 | * 3/2003 | Kawasuji et al. ............. 372/86 |
| 6,618,421 B2 | * 9/2003 | Das et al. ...................... 372/55 |
| 2002/0031160 A1 | * 3/2002 | Desor ........................... 372/57 |
| 2002/0141470 A1 | 10/2002 | Nakao et al. .................. 372/55 |

FOREIGN PATENT DOCUMENTS

DE          38 42 492          6/1990

* cited by examiner

Primary Examiner—Don Wong
Assistant Examiner—James Menefee
(74) Attorney, Agent, or Firm—Wenderoth, Lind & Ponack, L.L.P.

(57) ABSTRACT

In a gas laser device, a compensation time according to electric charges accumulated in a charging capacitor is calculated and, when the compensation time lapsed from a time when an outer trigger was input, a compensation trigger is output to a semiconductor switch to electrically connect the charging capacitor and a first-stage capacitor, whereby a time between the input of the outer trigger and the occurrence of light emission across discharge electrodes becomes constant in each pulse and a semiconductor substrate can be exposed to light with higher accuracy even when any components of a pulse power source are affected by a temperature change.

8 Claims, 11 Drawing Sheets

GAS LASER DEVICE

BACKGROUND OF THE INVENTION

1. Field of the Invention

The present invention relates to a gas laser device which controls to make constant a time between the input of an outer trigger and the emission of laser light.

2. Description of the Related Art

As a light source for a reduced projection exposure device (hereinafter referred to as a "stepper") for production of semiconductor devices, a gas laser device is used, and attention is especially being given to the use of an excimer laser among others.

Figure 9:
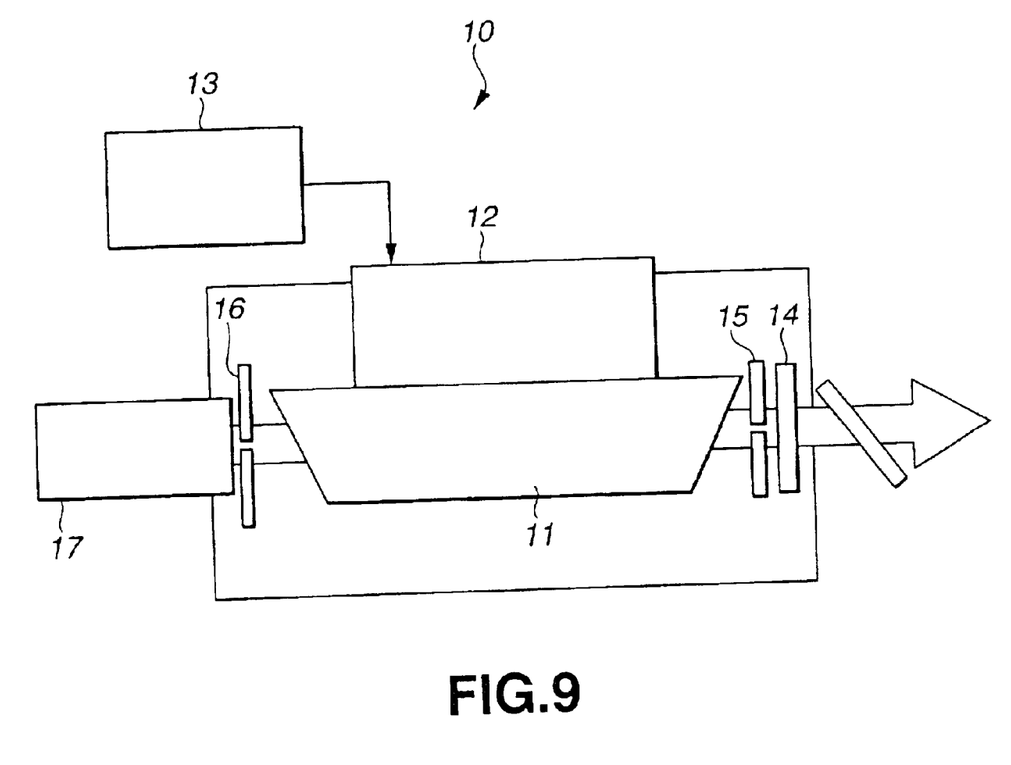
FIG. 9 is a diagram showing a structure of the excimer laser device 10.

FIG. 9 is a diagram showing the structure of an excimer laser device 10.

The excimer laser device 10 is comprised of a laser chamber 11 which has therein discharge electrodes for causing an electric discharge therebetween to excite laser gas so to output laser light, a pulse power source 12 which applies a high frequency voltage to the discharge electrodes, a charger 13 which charges the pulse power source 12, an output mirror 14 which resonates the laser light, apertures 15, 16 which determine a shape of the laser light, and a band narrowing module 17 for narrowing a spectral line width of the laser light.

Figure 10:
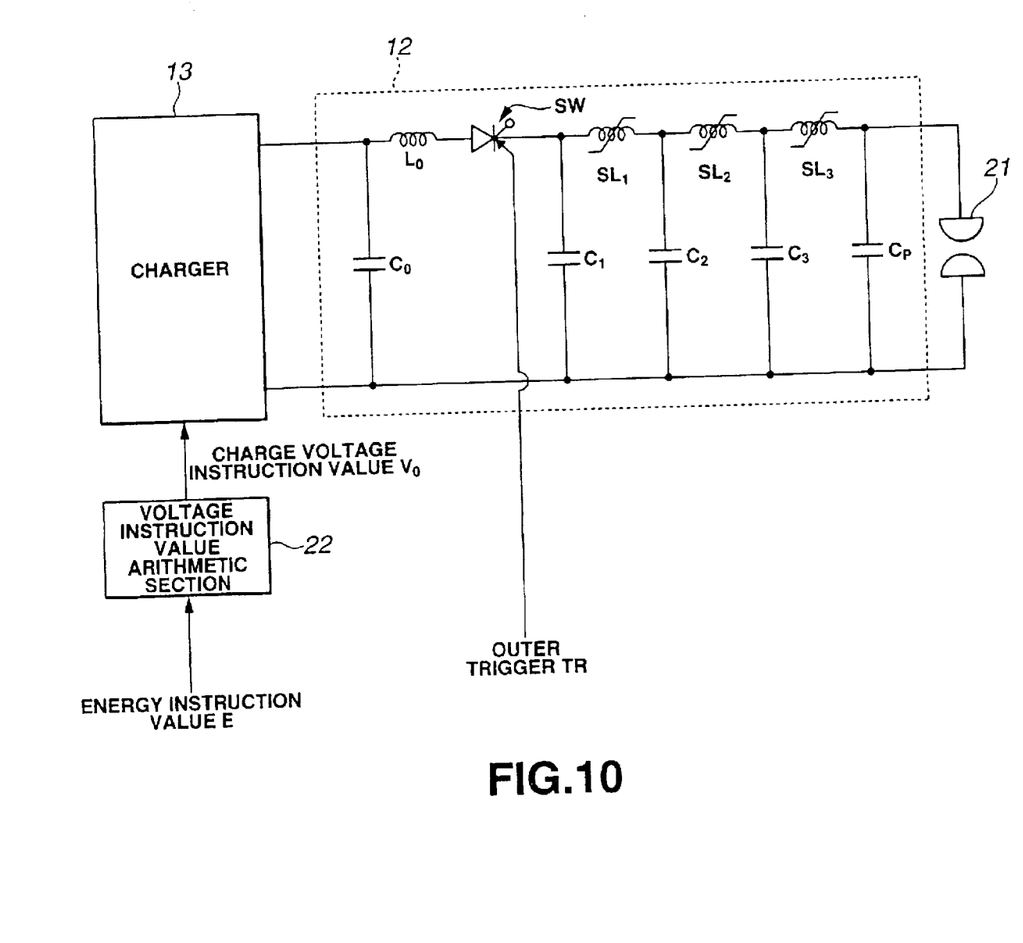
FIG. 10 is a diagram showing a circuit and peripheral components used for the pulse power source 12.

FIG. 10 is a diagram showing an example of a circuit and peripheral components used for the pulse power source 12. Generally, a magnet compression circuit is used for the pulse power source 12. A three-stage magnet compression circuit is used for the pulse power source 12 shown in FIG. 10.

In the pulse power source 12 shown in FIG. 10, a charging capacitor $C_0$ is connected to the charger 13. An assist coil $L_0$, a semiconductor switch SW and a transfer capacitor $C_1$ are connected in parallel to the charging capacitor $C_0$. A saturable reactor $SL_1$ and a transfer capacitor $C_2$ are connected in parallel to the transfer capacitor $C_1$. A saturable reactor $SL_2$ and a transfer capacitor $C_3$ are connected in parallel to the transfer capacitor $C_2$. A saturable reactor $SL_3$ and a peaking capacitor Cp are connected in parallel to the transfer capacitor $C_3$. Discharge electrodes 21 are connected in parallel to the peaking capacitor Cp.

Energy instruction value E required for each pulse is input to a voltage instruction value arithmetic section 22. In the voltage instruction value arithmetic section 22, charge voltage Vc of the charging capacitor $C_0$ is calculated according to the energy instruction value E, and charge voltage instruction value $V_0$ is output to the charger 13. The charging capacitor $C_0$ is recharged according to the charge voltage instruction value $V_0$.

When a trigger (hereinafter referred to as the "outer trigger") TR to be output from a stepper is input to the semiconductor switch SW, the semiconductor switch SW is turned on, and electric charges recharged into the charging capacitor $C_0$ are transferred to the transfer capacitor $C_1$. At this time, when a value obtained by integrating a voltage, which is applied to the saturable reactor $SL_1$, with respect to time reaches a prescribed level, the saturable reactor $SL_1$ is magnetically saturated, and inductance rapidly becomes small. Then, the transfer of electric charges from the front-stage transfer capacitor $C_1$ to the back-stage transfer capacitor $C_2$ is started. Thus, each saturable reactor SLn functions as the magnetic switch which is turned on by magnetic saturation.

Similarly, electric charges are sequentially transferred from the front-stage transfer capacitor Cn to the back-stage transfer capacitor $C_{n+1}$ and finally to the final peaking capacitor Cp by the switching function of the respective saturable reactors SLn. The voltage between the discharge electrodes 21 rises along with a voltage increase of the peaking capacitor Cp, and when the voltage between the discharge electrodes 21 reaches a prescribed value, the laser gas between the discharge electrodes 21 is produced an electrical breakdown, and the electric discharge is started. The laser gas is excited by the electric discharge, and the laser light is emitted.

Because it is configured in such a way that the inductance becomes smaller as the process advances from the front-stage saturable reactor SLn to the back-stage saturable reactor SLn+1, the pulse compression is effected so that the peak value of electric current passing through the circuit of each step increases sequentially, and a span of electrifying time becomes narrow. Therefore, a powerful discharge can be obtained between the discharge electrodes 21 in a short time.

The excimer laser device 10 is controlled as described below.

A semiconductor substrate is placed on a stage on the part of the stepper. The outer trigger TR is output from the stepper side to the excimer laser device 10 so to emit the laser light in synchronization with the operation of the stage. In order to perform exposure to light with high accuracy, the excimer laser device 10 must keep constant time Tt between the input of the outer trigger TR and the emission of the laser light. The time Tt will be referred to as total time Tt below.

The total time Tt includes a total value Td of time Tdn until each saturable reactor SLn turns on and delay time Ts peculiar to an LC circuit of the magnet compression circuit. The respective times Td, Ts are referred to as delay times Td, Ts below. The delay time Ts is normally constant.

Figure 11:
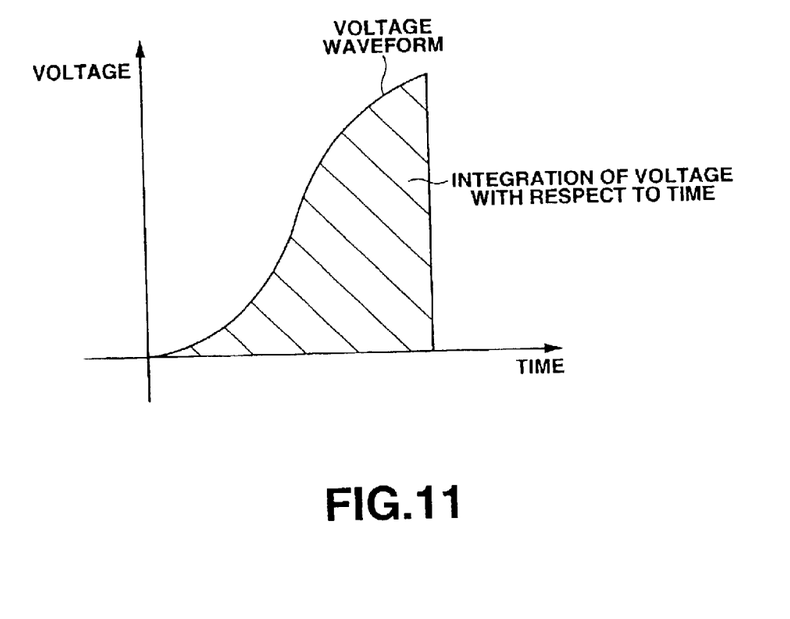
FIG. 11 is a diagram for illustrating the replacement of time integration of a voltage applied to the saturable reactor with the voltage and time product.

The delay time Tdn of the saturable reactor SLn is determined by the designs of a magnetic characteristic, a sectional area, a number of turns, and the like of the saturable reactor SLn. The delay time Tdn of the saturable reactor SLn which has such designs determined depends on a time integral value of the voltage applied to the saturable reactor SLn. Normally, the time integral value of the voltage is constant. Specifically, when the voltage applied to the saturable reactor SLn is low, the time to turn on the saturable reactor becomes long, and when the voltage applied to the saturable reactor SLn is high, the time to turn it on becomes short. As shown in FIG. 11, the time integral value of the applied voltage is indicated by an area surrounded by a time axis and a voltage waveform. The time integral value of the voltage will be used as a voltage and time product below. And, the voltage and time products of the respective saturable reactors SLn are assumed to be the voltage and time product of all saturable reactors SL.

The voltage applied to all saturable reactors SL is replaced with a voltage Vc of the charging capacitor $C_0$. Therefore, the delay time Td of all saturable reactors SL varies according to a variation in the voltage Vc of the charging capacitor $C_0$, and the total time Tt varies. Such variations are referred to as jitter.

Technologies for remedying the jitter problem are disclosed in Japanese Patent Application Laid-Open No. 11-289119 (hereinafter referred to as "Publication 1") and U.S. Pat. No. 6,016,325 (hereinafter referred to as "Publication 2"). In Publication 1 and Publication 2, time Tc for compensating delay time Td+Ts is determined to make the total time Tt constant. The time Tc will be referred to as the compensation time Tc below.

The voltage Vc of the charging capacitor $C_0$ is determined by an input charge voltage instruction value $V_0$. Therefore, the charge voltage instruction value $V_0$ and the delay time Td are mutually associated in Publication 1, and according to this associated relationship, the compensation time Tc corresponding to the charge voltage instruction value $V_0$ is previously determined so that the total time Tt becomes constant. And, when the charge voltage instruction value $V_0$ is input for each pulse, corresponding compensation time Tc is determined, so that the total time Tt becomes constant.

In Publication 2, not each charge voltage instruction value $V_0$ but actual voltage Vc of the charging capacitor $C_0$ is previously associated with the compensation time Tc.

But, the charge voltage instruction value $V_0$ and the associated relationship of the voltage Vc of the charging capacitor $C_0$ and the delay time Td are not always constant. For example, this relationship varies depending on a change in temperature of the charging capacitor $C_0$. As a result, correct compensation time Tc cannot be obtained.

Therefore, according to the technologies of Publications 1 and 2, it is necessary to operate to change the charge voltage instruction value $V_0$ and the relationship between the voltage Vc of the charging capacitor $C_0$ and the compensation time Tc according to a temperature change. But, such processing is not realistic because a complex process is required.

According to the technologies of Publications 1 and 2, when the charging capacitor $C_0$ is in an isothermal state, the total time Tt is constant, and the semiconductor substrate can be exposed to light accurately, but they have a disadvantage that when the charging capacitor $C_0$ has a temperature change, the total time Tt varies, and the semiconductor substrate cannot be exposed to light accurately.

Besides, the voltage and time product varies depending on a change in temperature of each saturable reactor SLn, and time for pulse compression varies depending on a change in temperature of each transfer capacitor Cn. The delay time Td is also variable depending on such factors. Therefore, it is necessary to set the compensation time Tc according to the state in consideration of the influence of a change in temperature.

The present invention was achieved under the above circumstances, and it is an object of the present invention to make it possible to perform the exposure of a semiconductor substrate with higher accuracy by keeping constant the total time at all times between the entry of the outer trigger and the emission of the laser light even when any component of the pulse power source has a temperature change.

SUMMARY OF THE INVENTION

A first aspect of the invention is directed to a gas laser device, comprising:

an electric charge transfer circuit which has a plurality of transfer capacitors and at least one saturable reactor, uses magnetic saturation of the saturable reactor to sequentially transfer an electric charge from a front-stage transfer capacitor to a back-stage transfer capacitor to cause an electric discharge across discharge electrodes which are connected to a final-stage transfer capacitor so to emit pulse laser light;

a charging capacitor which accumulates electric charges to be transferred to a first-stage transfer capacitor among the transfer capacitors;

electric charge amount measuring means which measures an amount of electric charges accumulated in the charging capacitor;

compensation trigger output means which determines a compensation time corresponding to the electric charge amount to make constant a time between the input of an outer trigger and the emission of light across the discharge electrodes for each pulse and outputs a compensation trigger after the lapse of the compensation time from the input of the outer trigger; and a switch which electrically connects the charging capacitor and the first-stage transfer capacitor according to the input of the compensation trigger.

A second aspect of the invention relates to the first aspect of the invention, wherein the compensation trigger output means previously stores a relationship between the compensation time and the inverse of the electric charge amount and determines the compensation time according to the stored relationship.

The first and second aspects of the present invention will be described with reference to FIG. 1 to FIG. 4.

Figure 1:
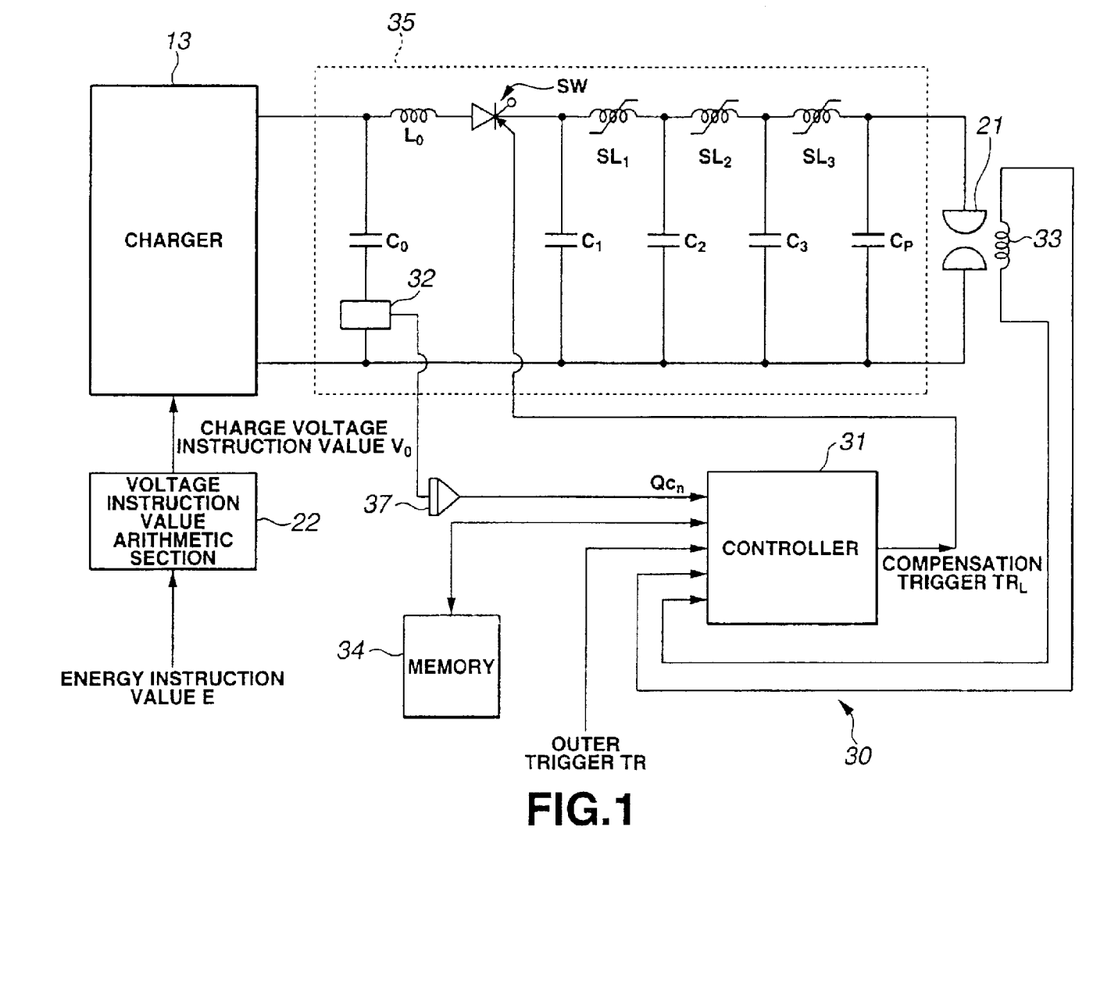
FIG. 1 is a block diagram showing an embodiment of the present invention.

A charging current flows from the charger 13 to the charging capacitor $C_0$ prior to each pulse. A current sensor (electric charge amount measuring means) 32 measures the charging current, and an integrator 37 calculates electric charge amount Qcn accumulated in the charging capacitor $C_0$ according to the time integral value.

Figure 2B:
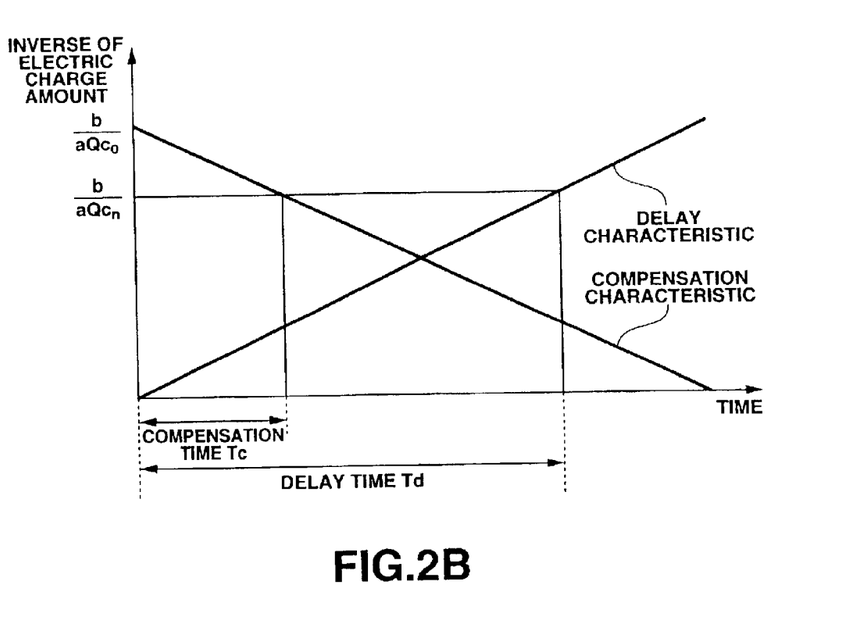
FIG. 2B is a diagram showing a delay characteristic and a compensation characteristic of the pulse power source 35.
Figure 3:
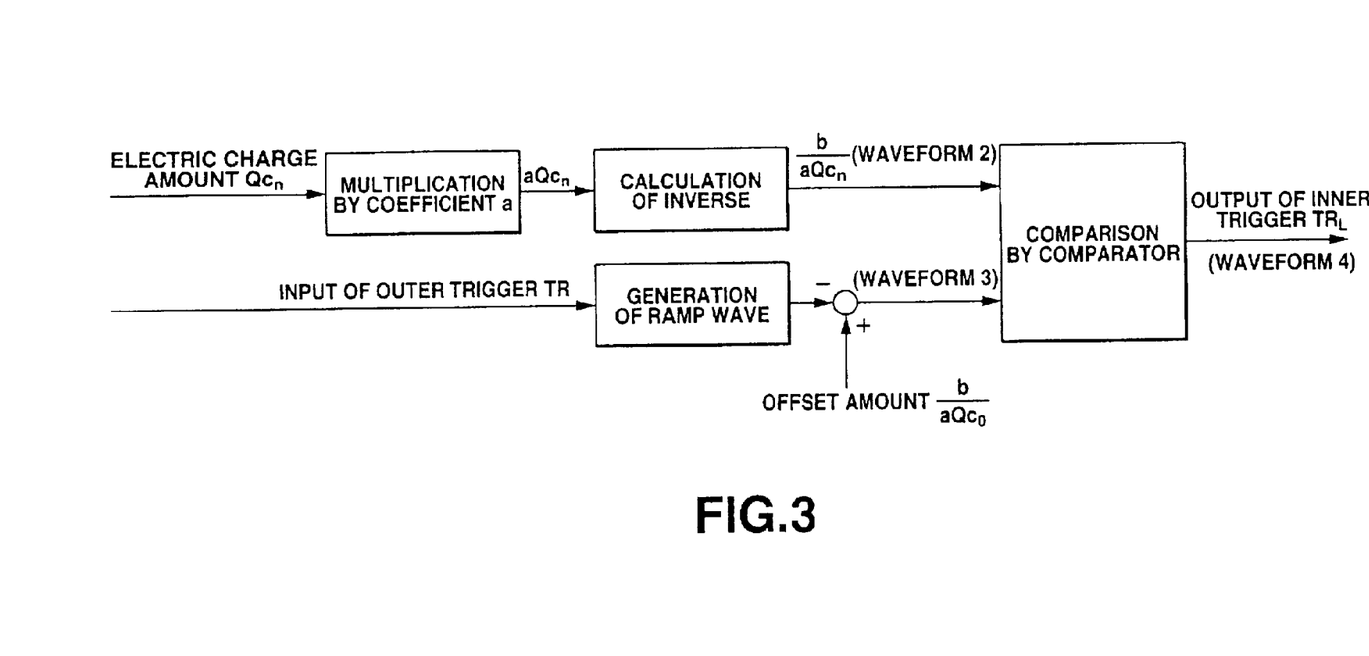
FIG. 3 is a block diagram showing processing steps by the controller 31.

As shown in FIG. 3, the electric charge amount Qcn and the outer trigger TR are input to a controller (compensation trigger output means) 31. When the electric charge amount Qcn is input, the inverse b/(aQcn) (a is the inverse of the capacity of the charging capacitor $C_0$, b is a proportional coefficient) of the electric charge amount is calculated. The controller 31 is determined to have a compensation characteristic as shown in FIG. 2(b). This compensation characteristic is indicated as a proportional relationship between compensation time Tc and variable b/(aQc). When the outer trigger TR is input, the variable b/(aQc) of a ramp wave generator starts to change. The variable b/(aQc) decreases with a lapse of time, and when it matches the inverse b/(aQcn) of the calculated electric charge amount, a compensation trigger $TR_L$ is output. This time is compensation time Tc.

When the compensation trigger $TR_L$ is input to the semiconductor switch SW, the semiconductor switch SW is turned on, and the electric charges accumulated in the charging capacitor $C_0$ are transferred to the transfer capacitor $C_1$. When the saturable reactor $SL_1$ becomes saturated magnetically, the electric charges transferred to the transfer capacitor $C_1$ are transferred to the back-stage transfer capacitor $C_2$. Thus, the electric charges are sequentially transferred from the front-stage transfer capacitor Cn to the back-stage transfer capacitor $C_{n+1}$, and an electric discharge is finally performed between the discharge electrodes 21 which are connected in parallel to the peaking capacitor Cp. Then, the laser light is emitted between the discharge electrodes 21.

According to the first and second aspects of the invention, the compensation time Tc is specified according to the compensation characteristic indicated by the proportional relationship between the variable b/(aQc) and the compensation time Tc using the electric charge amount Qc of the charging capacitor $C_0$. The electric charge amount Qc of the charging capacitor $C_0$ is not affected by a temperature change. Therefore, the compensation characteristic determined according to the electric charge amount is constant, so that the total time Tt can be kept constant even if the charging capacitor $C_0$ has a change in temperature, and the semiconductor substrate can be exposed to light with higher accuracy.

Besides, the value b/(aQc) which is proportional to the inverse of the electric charge amount Qc is determined as a variable, and the variable b/(aQc) and the compensation time Tc can be indicated in a proportional relationship. A circuit for processing the compensation characteristic indicated by the proportional relationship can be configured with ease. Therefore, the controller 31 can be configured with ease.

A third aspect of the invention is directed to the first aspect of the invention, wherein:

a delay time between the output of the compensation trigger and the emission of light across the discharge electrodes and the inverse of the electric charge amount are measured for each pulse, and the delay time and the inverse of the electric charge amount are stored for each pulse; and the compensation trigger output means determines a relationship between the delay time and the inverse of the electric charge amount on the basis of two or more stored delay times and the inverse of the electric charge amount corresponding to the delay times, and determines the relationship between the compensation time and the inverse of the electric charge amount for each pulse on the basis of the determined relationship between the delay time and the inverse of the electric charge amount.

The third aspect of the invention will be described with reference to FIG. 5 and FIG. 6.

The inverse b/(aQcn) of the electric charge amount and the delay time Tdn are measured for each pulse and stored in a memory 34. For example, the inverses b/(aQ$_{c1}$), b/(aQ$_{c2}$) of the electric charge amounts of the last pulse and the last but one pulse and delay times T$_{d1}$, T$_{d2}$ are read from the memory 34 for each pulse, and the latest delay characteristic of the inverse b/(aQc) of the electric charge amount and the delay time Td shown in FIG. 5 is calculated by the expression (1) below.

$$\{b/(aQ/_{c1})-b/(aQ_{c2})\}/\{(T_{d1}+Ts)-(Td_{d2}+Ts)\} \qquad (1)$$

By the expression (1), the ratio of change of the inverse of the electric charge amount to time in the delay characteristic is determined. This ratio is a gradient of the delay characteristic. And, a value is obtained by multiplying the ratio by −1. The obtained value is used as a gradient of the compensation characteristic to determine the latest compensation characteristic. According to the obtained compensation characteristic, the variable b/(aQc) of the ramp wave generator varies, and when it matches the inverse b/(aQcn) of the electric charge amount, the compensation trigger TR$_L$ is output. This time to match the inverse becomes the compensation time Tc.

According to the third aspect of the invention, the delay characteristic is determined for each pulse, and the compensation characteristic is determined according to the delay characteristic. Thus, the latest compensation characteristic is always kept determined, so that it is not affected by a change in voltage and time product due to a temperature change of each saturable reactor SLn. Therefore, the total time Tt can be made constant, and the semiconductor substrate can be exposed to light with higher accuracy.

A fourth aspect of the invention is directed to the second aspect of the invention, further comprising:

time difference output means which stores a target time between the input of the outer trigger and the emission of light across the discharge electrodes, measures a time between the input of the outer trigger and the emission of light across the discharge electrodes, determines a time difference between the target time and the measured time, and outputs the time difference to the compensation trigger output means, wherein:

the compensation trigger output means adds the time difference to the compensation time.

A fifth aspect of the invention is directed to the second aspect of the invention, further comprising:

time difference output means which stores a target time between the input of the outer trigger and the emission of light across the discharge electrodes, measures a time between the input of the outer trigger and the emission of light across the discharge electrodes, determines a time difference between the target time and the measured time, multiplies the time difference by a prescribed gain and outputs to the compensation trigger output means; wherein:

the compensation trigger output means adds the time difference, which has the prescribed gain multiplied, to a compensation time of a next pulse.

Sixth to eighth aspects of the invention are directed to the third to fifth aspects of the invention, further comprising:

an electromagnetic coil which detects the emission of light across the discharge electrodes as a change in a magnetic flux density, wherein:

the compensation trigger output means measures the delay time or a time between the input of the outer trigger and the emission of light across the discharge electrodes on the basis of the detected result by the electromagnetic coil.

The fourth to eighth aspects of the invention will be described with reference to FIG. 1, FIG. 8 and FIG. 9.

The controller 31 is previously determined to have a voltage corresponding to a target value of the total time Tt.

Meanwhile, when the outer trigger TR is input to the controller 31 for each pulse, a voltage of the ramp wave generator is started to rise. When the laser light is emitted between the discharge electrodes 21, the electric current flows through an electromagnetic coil 33 which is disposed in the vicinity of the discharge electrodes 21, the emission of the laser light is confirmed by the controller 31, and the voltage of the ramp wave generator for measuring time is stopped increasing. At this time, the voltage of the ramp wave generator for time measurement is sampled and held for measurement of a difference from the target value.

The obtained difference is multiplied by a prescribed gain to have a voltage corresponding to the compensation time Ta, and it is input to the ramp wave generator which generates the variable b/(aQc). Then, for the next pulse, after a lapse of the compensation time Ta from the input of the outer trigger TR, the variable b/(aQc) of the ramp wave generator is started to decrease. And, the compensation trigger TR$_L$ is output after a lapse of compensation time T'c.

According to the fourth to eighth aspects of the invention, the factors which cannot be compensated by the first to third aspects of the invention, for example, a change in delay time due to a temperature change of the transfer capacitor Cn can be compensated. Therefore, the total time Tt can be kept constant, and the semiconductor substrate can be exposed to light with higher accuracy.

DETAILED DESCRIPTION OF THE PREFERRED EMBODIMENTS

Embodiments of the present invention will be described with reference to the accompanying drawings.

FIG. 1 is a block diagram showing a first embodiment of the present invention. Like reference numerals are used to denote like components as those of the pulse power source 12 shown in FIG. 10.

An emission time control 30 of the gas laser device according to this embodiment comprises a pulse power source 35, a charger 13 which charges a charging capacitor $C_0$ of the pulse power source 35, a controller 31 which determines compensation time Tc, inputs an outer trigger TR output from an unshown stepper and outputs a compensation trigger $TR_L$ after a lapse of the determined compensation time Tc, a voltage instruction value arithmetic section 22 which outputs charge voltage instruction value $V_0$ to the charger 13 based on the energy instruction value E output from the stepper, and a memory 34.

A current sensor 32 is connected to the charging capacitor $C_0$ of the pulse power source 35. The current sensor 32 measures a charge current flowing between the charger 13 and the charging capacitor $C_0$. The charge current is integrated with respect to time by an integrator 37 to determine electric charge amount Qcn.

The electric charge amount Qcn which is output from the outer trigger TR and the integrator 37 is input to the controller 31. The compensation trigger $TR_L$ is output after a lapse of compensation time Tc which is specified on the basis of variable b/(aQc) (b is a proportional coefficient) and the inverse b/(aQcn) of the measured electric charge amount Qcn. The controller 31 comprises various types of computing units, a ramp wave generator, a comparator, a flit-flop, a sample-and-hold circuit and the like.

An electromagnetic coil 33, which is connected to the controller 31, is disposed in the vicinity of the discharge electrodes 21 which are connected in parallel to the peaking capacitor Cp of the pulse power source 35. When an electric discharge is effected between the discharge electrodes 21 to emit the laser light, a magnetic flux density around the discharge electrodes 21 varies. When the magnetic flux density varies, an electric current flows to the electromagnetic coil 33 and is output to the controller 31. When a prescribed electric current is output from the electromagnetic coil 33, the controller 31 judges that the laser light was emitted between the discharge electrodes 21.

Various kinds of measured values, computed values and the like are subjected to the A/D conversion for each pulse and stored in the memory 34. Such various kinds of measured values, computed values and the like are subjected to D/A conversion and output to the controller 31.

Figure 2A:
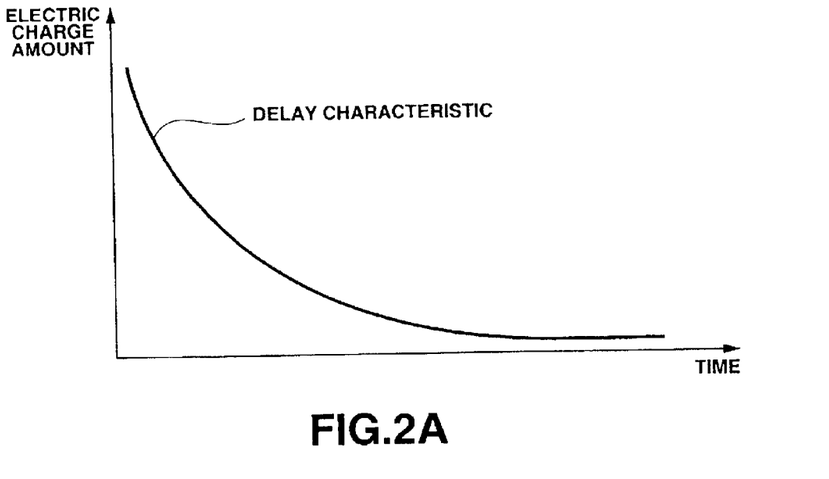
FIG. 2A is a diagram showing a delay characteristic of a pulse power source 35.

FIG. 2 is a diagram showing a delay characteristic of the pulse power source 35.

It is apparent from a relationship of Vc=aQc (a is the inverse of the capacity of the charging capacitor $C_0$) that voltage Vc of the charging capacitor $C_0$ is proportional to electric charge amount Qc. Therefore, it is assumed in the present invention that the voltage and time product of all saturable reactors SL is the electric charge amount and time product. Generally, the voltage and time product, namely the electric charge amount and time product, is constant, so that the delay characteristic of the pulse power source 35 is indicated as an inverse proportional relationship between an electric charge amount and time as shown in FIG. 2A. It is possible to determine delay time Td and compensation time Tc according to the delay characteristic. But, according to the present invention, the delay characteristic is previously determined as a proportional relationship between the inverse b/(aQc) of the electric charge amount and time as shown in FIG. 2B. Besides, the compensation characteristic having as gradient a value, which is obtained by multiplying a ratio of change of the inverse of the electric charge amount to time of the delay characteristic, namely gradient, by −1, is previously determined. The controller 31 is previously determined to have the compensation characteristic, and the compensation time Tc is determined by the intersection point of the inverse b/(aQcn) of the measured electric charge amount Qcn and the compensation characteristic.

Then, the operation of the light emission time control 30 according to the first embodiment will be described with reference to FIG. 1, FIG. 3 and FIG. 4.

FIG. 3 is a block diagram showing processing steps by the controller 31 when the electric charge amount and time product is constant. FIG. 4 is a time chart of the processing steps by the controller 31.

Prior to each pulse, energy instruction value E is input from an unshown stepper to a voltage instruction value arithmetic section 22, and a charge voltage instruction value $V_0$ is input from the voltage instruction value arithmetic section 22 to the charger 13. Then, a charging current flows between the charger 13 and the charging capacitor $C_0$. The current sensor 32 measures the charging current, and the measured value is integrated with respect to time by the integrator 37 to calculate the electric charge amount Qcn. As shown in FIG. 3, the controller 31 multiplies the calculated electric charge amount Qcn by coefficient a and calculates the inverse of the calculated value aQcn to determine computed value b/(aQcn) (b is a proportional coefficient). FIG. 4 shows the computed value b/(aQcn) as b/(a$Q_{c1}$) in waveform 2.

Figure 4:
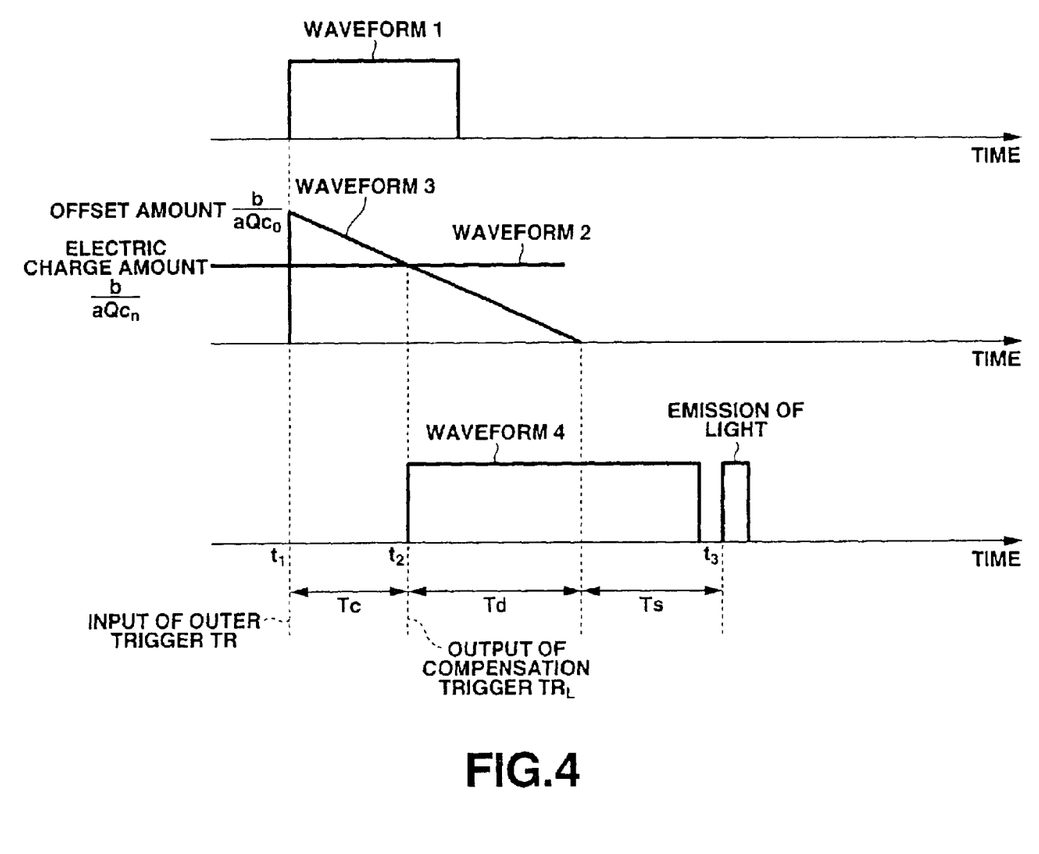
FIG. 4 is a time chart of the processing steps by the controller 31.

As indicated by waveform 1 in FIG. 4, when the outer trigger TR is input at time t1, variable b/(aQc) of the ramp wave generator starts to decrease at a fixed ratio. At this time, an offset amount of variable b/(aQc) is b/(a$Q_{c0}$). The variable b/(aQc) which varies with a lapse of time has a ramp wave as indicated by waveform 3 in FIG. 4. The waveform 3 matches the compensation characteristic shown in FIG. 2(b). The comparator continuously compares the variable b/(aQc) and the computed value b/(a$Q_{c1}$) from time $t_1$. And, the variable b/(aQc) agrees with the computed value b/(a$Q_{c1}$) at time $t_2$ after a lapse of compensation time Tc from the time $t_1$. Specifically, the waveform 3 and the waveform 2 intersect at the time $t_2$. At this time, the compensation trigger $TR_L$ is output from the comparator as indicated by waveform 4. Thus, the compensation trigger TR$_L$ is output after a lapse of the compensation time Tc from the input of the outer trigger TR.

When the compensation trigger TR$_L$ is input to the semiconductor switch SW, the electric charge is started to be transferred from the charging capacitor C$_0$ to the transfer capacitor C$_1$. And, the pulse is compressed, and the laser light is emitted at the time t$_3$ after a lapse of delay time Td+Ts from the time t$_2$.

The above processing can also be performed by several μsec of high-speed arithmetic processing and real-time processing of analog operation.

According to the first embodiment, the compensation time Tc is specified on the basis of the compensation characteristic which is indicated by a proportional relationship between the variable b/(aQc) using the electric charge amount Qc of the charging capacitor C$_0$ and the compensation time Tc. The electric charge amount Qc of the charging capacitor C$_0$ is not affected by a temperature change. Therefore, the compensation characteristic which is determined on the basis of the electric charge amount is constant, so that even when the charging capacitor CO has a temperature change, the total time Tt can be kept constant, and the semiconductor substrate can be exposed to light with higher accuracy.

Besides, value b/(aQc) proportional to the inverse of the electric charge amount Qc is determined as a variable, the variable b/(aQc) and the compensation time Tc can be indicated in the proportional relationship. A circuit for processing the compensation characteristic indicated in the proportional relationship can be configured with ease. Therefore, the controller 31 can be configured readily.

A second embodiment will be described with reference to FIG. 1, FIG. 5 and FIG. 6.

The electric charge amount and time product of all saturable reactors SL is normally constant. But, when a high thermal load is applied to each saturable reactor SLn, the electric charge amount and time product may vary. Then, a gradient of the delay characteristic of the pulse power source 35 varies. Namely, a ratio of the variation in delay time Td and the variation in variable b/(aQc) varies. Such a change is called a drift.

Figure 5:
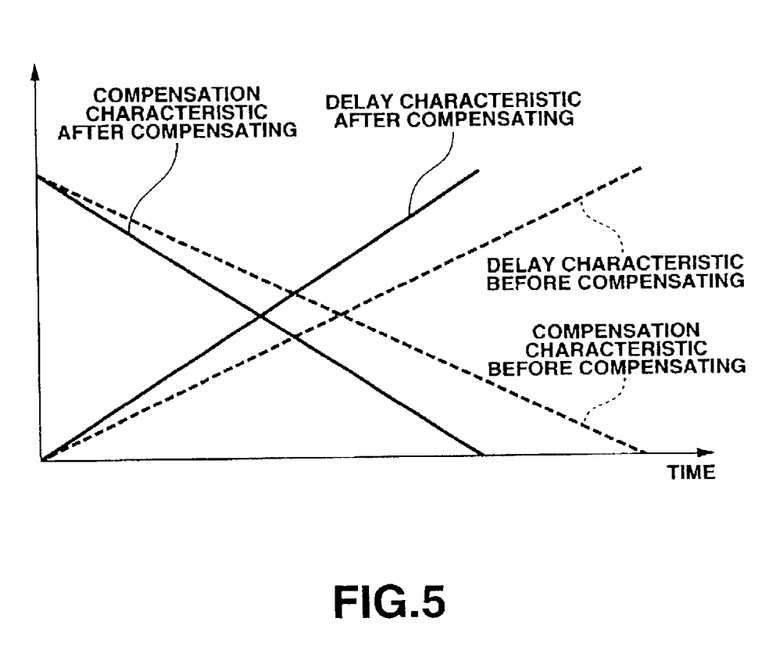
FIG. 5 is a diagram showing a delay characteristic and a compensation characteristic of the pulse power source 35.

FIG. 5 is a diagram showing the delay characteristics and the compensation characteristics of the pulse power source 35, showing that the delay characteristics and compensation characteristics with gradients varied because of the change in the electric charge amount and time product. It is seen in FIG. 5 that the electric charge amount and time product has become small.

As shown in FIG. 5, when the delay characteristic of the pulse power source 35 varies, an appropriate compensation time Tc is determined by varying the compensation characteristic in compliance with the delay characteristic for each pulse. This embodiment has the same structure as the first embodiment, so that its operation only will be described below.

Figure 6:
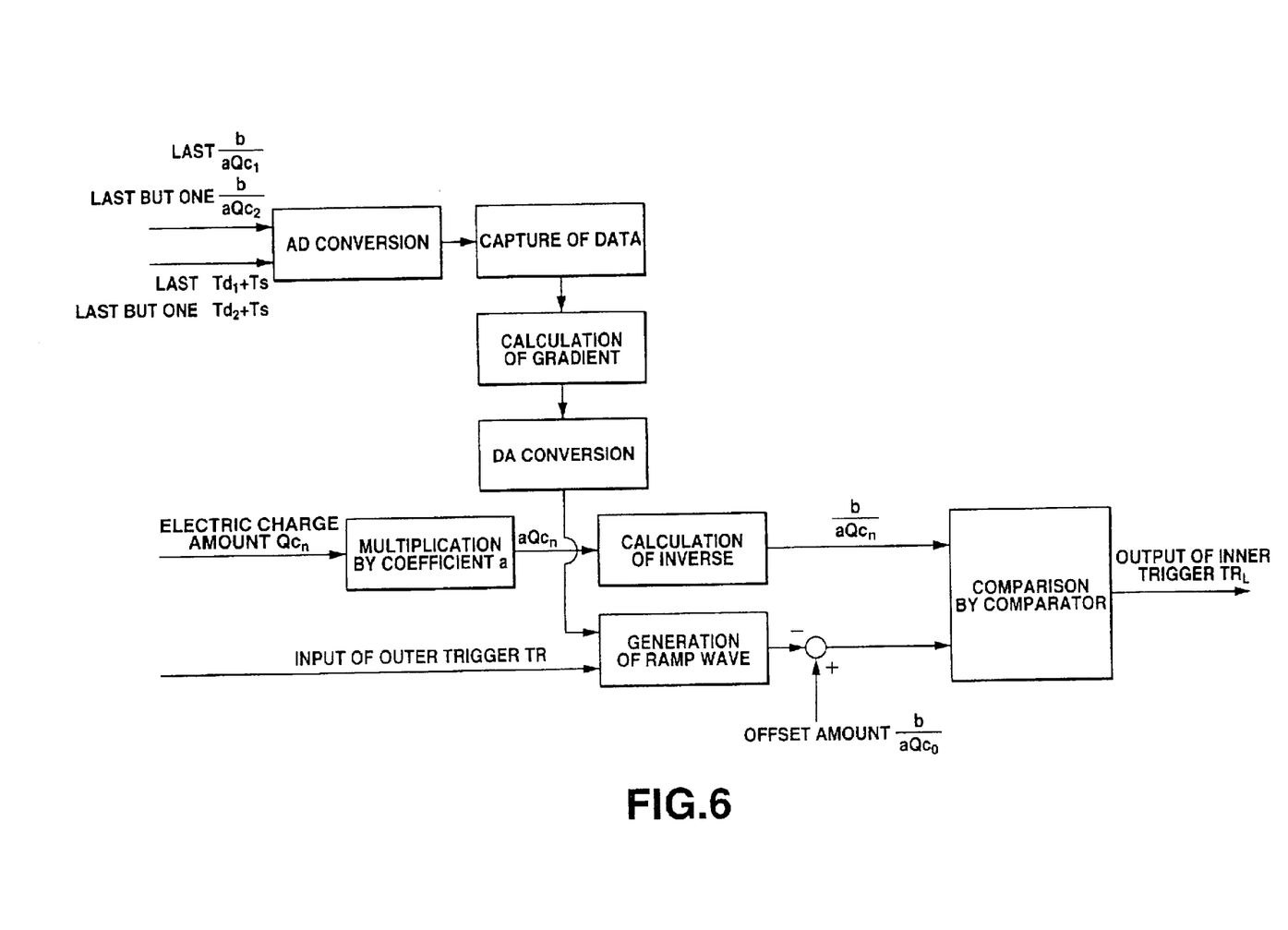
FIG. 6 is a block diagram showing processing steps by the controller 31.

FIG. 6 is a block diagram showing processing steps by the controller 31 when the electric charge amount and time product varies. The same processing steps as those shown in FIG. 3 will not be described.

The inverse b/(aQcn) of the electric charge amount and the delay time Tdn are measured for each pulse. The delay times Tdn, Ts and computed value b/(aQcn) of the electric charge amount for each pulse are subjected to A/D conversion and stored in the memory 34. For example, delay time T$_{d1}$+Ts and computed value b/(aQ$_{c1}$) of the electric charge amount for the previous pulse and delay time Td$_2$+Ts and computed value b/(aQ$_{c2}$) of the electric charge amount for the last but one pulse are read from the memory 34. And, calculation is made by the following expression to determine a gradient of the delay characteristic.

$$\{b/(aQ_{c1})-b/(aQ_{c2})\}/\{(T_{d1}+Ts)-(T_{d2}+Ts)\} \quad (1)$$

Besides, the gradient is multiplied by −1, subjected to the D/A conversion, and input to the ramp wave generator. Then, a ratio of reduction of the variable b/(aQc) of the ramp wave generator after the input of the outer trigger TR varies. Specifically, the compensation characteristic is varied as shown in FIG. 5. Because the latest compensation characteristic is determined for each pulse as described above, the appropriate compensation time Tc can be obtained even when the electric charge amount and time product is varied.

When a high thermal load is applied to the pulse power source 35, the delay time Ts may vary. But, a variation of the delay time Ts to a lapse of time is small, and a change between prescribed pulses can be disregarded. Therefore, the variation can be disregarded and can be calculated as the same value by the expression (1).

Thus, the compensation trigger TR$_L$ is output after a lapse of compensation time Tc from the input of the external trigger TR.

According to the second embodiment, the delay characteristic is determined for each pulse, and the compensation characteristic is determined according to the delay characteristic. Thus, because the latest compensation characteristic is always determined, the compensation characteristic can be varied in compliance with a change of the voltage and time product (an electric charge amount and time product) due to a temperature change of all saturable reactors SL. Therefore, the total time Tt can be made constant, and the semiconductor substrate can be exposed to light with higher accuracy.

A third embodiment of the invention will be described with reference to FIG. 1, FIG. 7 and FIG. 8.

When laser oscillation is continued, the temperature of the transfer capacitor Cn rises. Delay time Td+Ts may vary to become short with the increase of the temperature of the transfer capacitor Cn. Such variation is also called a drift. When the drift occurs, time Ta corresponding to a shortened portion of the delay time Td+Ts must be set independent of the compensation time Tc. This time Ta will be referred to as compensation time Ta below. Because this embodiment has the same structure as the first embodiment, its operation only will be described below.

Figure 7:
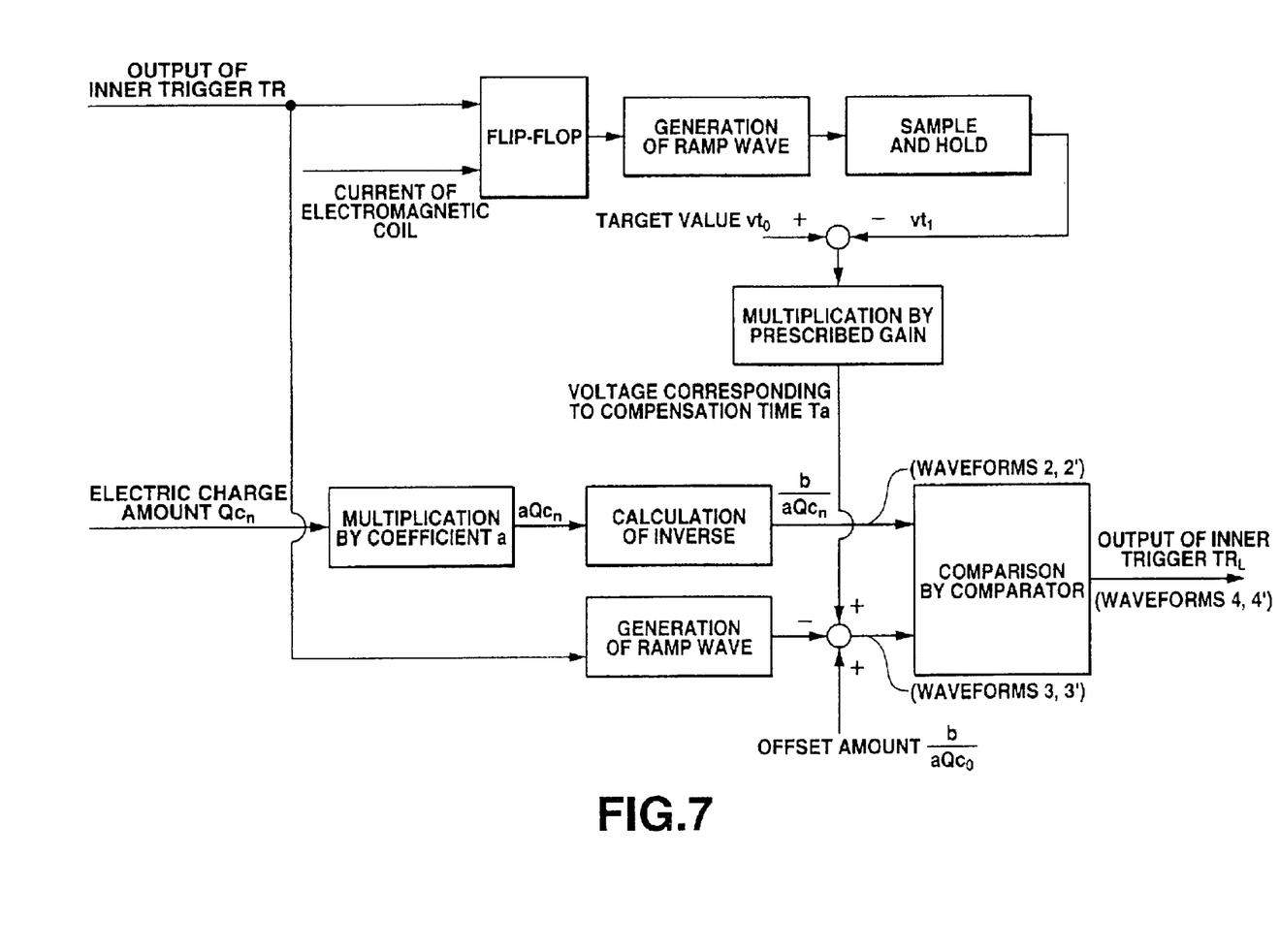
FIG. 7 is a block diagram showing processing steps by the controller 31.

FIG. 7 is a block diagram showing processing steps by the controller 31. FIG. 8 is a time chart of the processing steps by the controller 31.

A ramp wave generator for measuring a flip-flop and time is used for the controller 31 to measure time between the input of the outer trigger TR and the emission of the laser light. Voltage v$_{t0}$ corresponding to a target value of the total time Tt is also set previously. FIG. 8 shows the voltage v$_{t0}$ as waveform 7.

Before each pulse, energy instruction value E is input from an unshown stepper to the voltage instruction value arithmetic section 22, and charge voltage instruction value V$_0$ is input from the voltage instruction value arithmetic section 22 to the charger 13. Then, the charging current flows between the charger 13 and the charging capacitor C$_0$. The current sensor 32 measures the charging current, and the integrator 37 integrates the measured value with respect to time to determine electric charge amount Q$_{c1}$. As shown in FIG. 7, the controller 31 multiplies the obtained electric charge amount $Q_{c1}$ by a coefficient a and calculates the inverse of the calculated value $aQ_{c1}$ to determine the calculated value $b/(aQ_{c1})$ (b is a proportional coefficient). FIG. 8 shows the calculated value $b/(aQ_{c1})$ as waveform 2.

Figure 8:
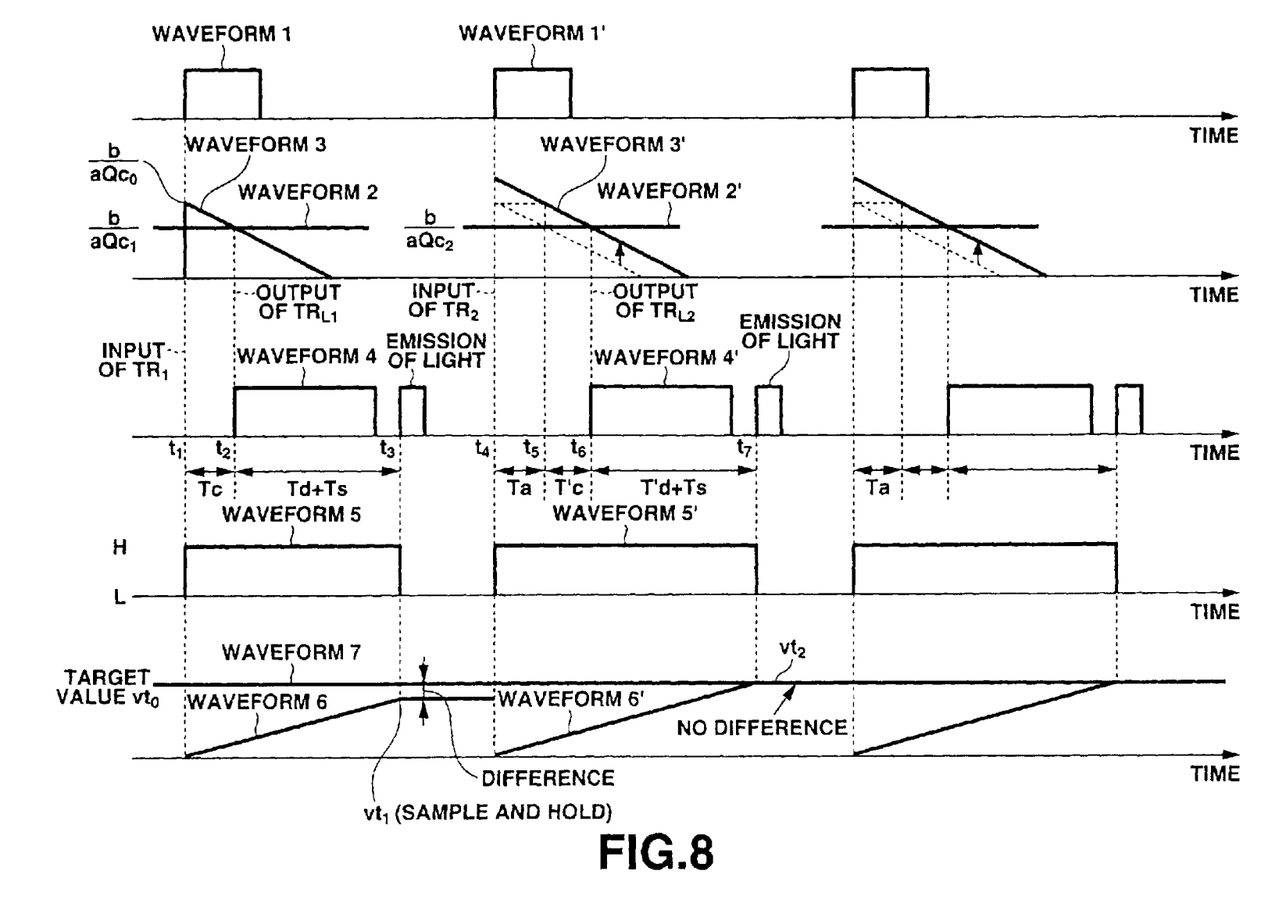
FIG. 8 is a time chart of the processing steps by the controller 31.

As indicated by waveform 1 in FIG. 8, when the outer trigger $TR_1$ is input at time t1, variable $b/(aQc)$ of the ramp wave generator starts to decrease at a fixed ratio. At this time, an offset of the variable $b/(aQc)$ is $b/(aQ_{c0})$. A change of the variable $b/(aQc)$ according to the lapse of time has the ramp wave as indicated by waveform 3 in FIG. 8. This waveform 3 matches the compensation characteristic shown in FIG. 2(b). The comparator continuously compares the variable $b/(aQc)$ and the computed value $b/(aQ_{c1})$ from the time t1. And, the variable $b/(aQc)$ matches the computed value $b/(aQ_{c1})$ at time t2 after a lapse of compensation time Tc from the time $t_1$. Namely, the waveform 3 and the waveform 2 intersect at the time t2. At this time, the compensation trigger $TR_{L1}$ is output from the comparator as indicated by waveform 4.

When the compensation trigger $TR_{L1}$ is input to the semiconductor switch SW, the transfer of the electric charge from the charging capacitor $C_0$ to the transfer capacitor $C_1$ is started. And, a pulse is compressed, and the laser light is emitted at time t3 after a lapse of delay time Td+Ts from the time $t_2$.

Meanwhile, when the outer trigger $TR_1$ is input at the time $t_1$, the flip-flop is set to have high level H as indicated by waveform 5 of FIG. 8, and voltage vs of the ramp wave generator for measuring time starts to rise at a fixed ratio as indicated by waveform 6. When the laser light is emitted at the time $t_3$ and a prescribed current is input from the electromagnetic coil 33, the flip-flop is reset to have low level L, and a voltage increase of the ramp wave generator for measuring time is stopped. At this time, voltage value $v_{t1}$ is sampled and held. And a difference between this voltage value $v_{t1}$ and voltage value $v_{t0}$ corresponding to the target value of the total time Tt is determined. The obtained difference is multiplied by a prescribed gain to determine a voltage value corresponding to the compensation time Ta. The voltage value corresponding to the compensation time Ta is added to the output of the ramp wave generator and used for compensation of an offset amount of the variable $b/(aQc)$ for the next pulse. In other words, feedback control is performed.

For the next pulse, the controller 31 multiplies the electric charge amount $Q_{c2}$ of the charging capacitor $C_0$, which is determined by the integrator 37, by the coefficient a, and calculates the inverse of the computed value $aQ_{c2}$ to determine computed value $b/(aQ_{c2})$ as shown in FIG. 7. FIG. 8 shows the computed value $b/(aQ_{c2})$ as waveform 2'.

As indicated by waveform 1' in FIG. 8, when the outer trigger $TR_2$ is input at time t4 (>t3), the variable $b/(aQc)$ of the ramp wave generator starts to decrease at a fixed ratio from the time t4. At this time, an offset of the variable $b/(aQc)$ is a value which is obtained by adding to $b/(aQ_{c0})$ a voltage value corresponding to the compensation time Ta determined for the previous pulse. The change of the variable $b/(aQc)$ with a lapse of time is indicated by a ramp wave which has waveform 3' as shown in FIG. 8. The gradient of the waveform 3' matches the compensation characteristic shown in FIG. 2(b). The comparator continuously compares the variable $b/(aQc)$ and the computed value $b/(aQ_{c2})$ from the time t4. And, the variable $b/(aQc)$ matches the computed value $b/(aQ_{c2})$ at time t6 after a lapse of compensation time T'c from time t5. In other words, the waveform 3' and the waveform 2' intersect at the time t6. At this time, compensation trigger $TR_{L2}$ is output from the comparator as indicated by waveform 4'.

When the compensation trigger $TR_{L2}$ is input to the semiconductor switch SW, electric charges are started to be transferred from the charging capacitor $C_0$ to the transfer capacitor $C_1$. And, a pulse is compressed, and the laser light is emitted at time $t_7$ after a lapse of delay time T'd+Ts from the time $t_6$.

Meanwhile, when the outer trigger $TR_2$ is input at the time $t_4$, the flip-flop is set to have high level H as indicated by waveform 5' of FIG. 8, and voltage vs of the ramp wave generator for measuring time starts to rise at a prescribed ratio as indicated by waveform 6'. When the laser light is emitted at the time $t_7$ and a light emission signal of the electromagnetic coil 33 is input, the flip-flop is reset to have low level L, and the voltage increase of the ramp wave generator for measuring time is stopped. At this time, voltage value $v_{t2}$ is sampled and held. And, a difference between this voltage value $v_{t2}$ and voltage value $v_{t0}$ corresponding to the target value of the total time Tt is determined. FIG. 8 shows that the values of waveforms 6' and 7 match to each other. Therefore, the total time Tt can be agreed with the target value by performing parallel movement of the waveform 3 using a value corresponding to the compensation time Ta used for this pulse.

When the difference between the sampled and held voltage value $v_{tn}$ and the voltage value $v_{t0}$ corresponding to the target value of the total time Tt is minus, time to output the compensation trigger $TR_L$ is delayed. In other words, the waveform 3 of FIG. 8 moves to the right. When the difference between the sampled and held voltage value $v_{tn}$ and the voltage value $v_{t0}$ corresponding to the target value of the total time Tt is plus, time to output the compensation trigger $TR_L$ is advanced. In other words, the waveform 3 of FIG. 8 moves to the left.

In this embodiment, the voltage value corresponding to the compensation time Ta, which is obtained by multiplying the difference between the sampled and held voltage value $v_{tn}$ and the voltage value $v_{t0}$ corresponding to the target value of the total time Tt by a prescribed gain is used to make the voltage value $v_{t0}$ match the voltage value $v_{t0}$ for the next pulse. The above procedure is not exclusive, and a prescribed gain may be set small to make the voltage value $v_{tn}$ gradually approach the voltage value $v_{t0}$. And, the prescribed gain may be varied depending on a magnitude of the difference between the voltage value $v_{tn}$ and the voltage value $v_{t0}$. Besides, when the prescribed gain is set to be proportional to the difference between the voltage value $v_{tn}$ and the voltage value $v_{t0}$, it is possible to control that if the difference between the voltage value $v_{tn}$ and the voltage value $v_{t0}$ is large, the voltage value $v_{tn}$ is quickly approached to the voltage value $v_{t0}$, and if the difference between the voltage value $v_{tn}$ and the voltage value $v_{t0}$ is small, the voltage value $v_{tn}$ is finely adjusted.

According to the third embodiment, factors which cannot be compensated by the first and second embodiments, for example a change in delay time due to a temperature change of the transfer capacitor Cn, can be compensated. Therefore, the total time Tt can be made constant, and the semiconductor substrate can be exposed to light with higher accuracy.

The light emission time control 30 according to the present invention can be applied to every gas laser device which employs a magnet compression circuit.

What is claimed is:

1. A gas laser device, comprising:
   an electric charge transfer circuit which has a plurality of transfer capacitors and at least one saturable reactor, uses magnetic saturation of the saturable reactor to sequentially transfer an electric charge from a front-stage transfer capacitor to a back-stage transfer capacitor to cause an electric discharge across discharge electrodes which are connected to a final-stage transfer capacitor so to emit pulse laser light;

a charging capacitor which accumulates electric charges to be transferred to a first-stage transfer capacitor among the transfer capacitors;

electric charge amount measuring means which measures an amount of electric charges accumulated in the charging capacitor;

compensation trigger output means which determines a compensation time corresponding to the electric charge amount to make constant a time between the input of an outer trigger and the emission of light across the discharge electrodes for each pulse and outputs a compensation trigger after the lapse of the compensation time from the input of the outer trigger; and a switch which electrically connects the charging capacitor and the first-stage transfer capacitor according to the input of the compensation trigger.

2. The gas laser device according to claim 1, wherein the compensation trigger output means previously stores a relationship between the compensation time and the inverse of the electric charge amount and determines the compensation time according to the stored relationship.

3. The gas laser device according to claim 2, further comprising:

time difference output means which stores a target time between the input of the outer trigger and the emission of light across the discharge electrodes, measures a time between the input of the outer trigger and the emission of light across the discharge electrodes, determines a time difference between the target time and the measured time, and outputs the time difference to the compensation trigger output means, wherein:

the compensation trigger output means adds the time difference to the compensation time.

4. The gas laser device according to claim 3, further comprising:

an electromagnetic coil which detects the emission of light across the discharge electrodes as a change in a magnetic flux density, wherein:

the compensation trigger output means measures the delay time or a time between the input of the outer trigger and the emission of light across the discharge electrodes on the basis of the detected result by the electromagnetic coil.

5. The gas laser device according to claim 2, further comprising:

time difference output means which stores a target time between the input of the outer trigger and the emission of light across the discharge electrodes, measures a time between the input of the outer trigger and the emission of light across the discharge electrodes, determines a time difference between the target time and the measured time, multiplies the time difference by a prescribed gain and outputs to the compensation trigger output means; wherein:

the compensation trigger output means adds the time difference, which has the prescribed gain multiplied, to a compensation time of a next pulse.

6. The gas laser device according to claim 5, further comprising:

an electromagnetic coil which detects the emission of light across the discharge electrodes as a change in a magnetic flux density, wherein:

the compensation trigger output means measures the delay time or a time between the input of the outer trigger and the emission of light across the discharge electrodes on the basis of the detected result by the electromagnetic coil.

7. The gas laser device according to claim 1, wherein:

delay time between the output of the compensation trigger and the emission of light across the discharge electrodes and the inverse of the electric charge amount are measured for each pulse, and the delay time and the inverse of the electric charge amount are stored for each pulse; and the compensation trigger output means determines a relationship between the delay time and the inverse of the electric charge amount on the basis of two or more stored delay times and the inverse of the electric charge amount corresponding to the delay times, and determines the relationship between the compensation time and the inverse of the electric charge amount for each pulse on the basis of the determined relationship between the delay time and the inverse of the electric charge amount.

8. The gas laser device according to claim 7, further comprising:

an electromagnetic coil which detects the emission of light across the discharge electrodes as a change in a magnetic flux density, wherein:

the compensation trigger output means measures the outer trigger or a time between the input of the delay time and the emission of light across the discharge electrodes on the basis of the detected result by the electromagnetic coil.

* * * * *